Oct. 4, 1932.   O. H. WEBER   1,880,556
INTERNAL COMBUSTION ENGINE
Filed Feb. 19, 1930
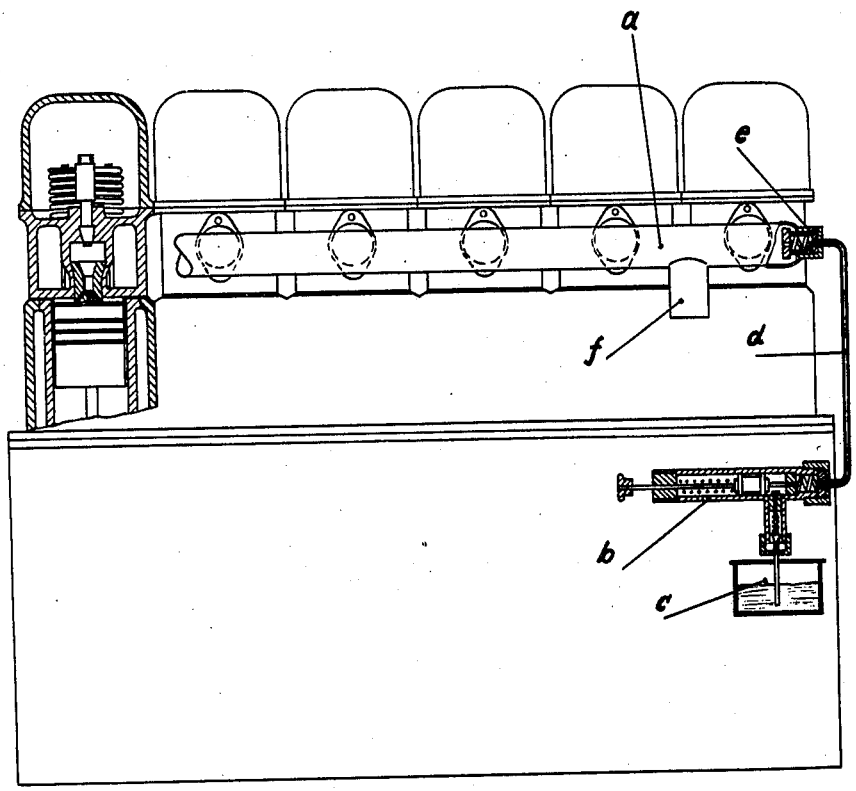

Patented Oct. 4, 1932

1,880,556

UNITED STATES PATENT OFFICE

OTTO HERMANN WEBER, OF ESSLINGEN-ON-THE-NECKAR, GERMANY, ASSIGNOR TO DAIMLER-BENZ AKTIENGESELLSCHAFT, OF STUTTGART-UNTERTURKHEIM, GERMANY, A COMPANY OF GERMANY

INTERNAL COMBUSTION ENGINE

Application filed February 19, 1930, Serial No. 429,659, and in Germany January 13, 1927.

When starting high-compression spontaneously igniting injection internal-combustion engines, the walls of the combustion chamber are still cold. Moreover the fuel which is injected towards the end of the compression stroke, and which is difficult to ignite, is only insufficiently atomized, in consequence of the low speed of revolution, which is considerably below the normal speed during starting. Under these circumstances the first ignitions are liable to fail. This applies particularly to motors having a precombustion chamber.

Now in spontaneously igniting injection internal-combustion engines it is a known practice to compress a mixture of air and fuel which is difficult to ignite, the ignition temperature of the mixture not being reached, and then to initiate the ignition in the neighbourhood of the dead centre by suddenly or gradually injecting a more inflammable fuel. It has further been already proposed to inject into the compression space a readily ignitible fuel and a fuel that is difficult to ignite, so as to produce a stratification of two mixtures, in order to facilitate the starting of the ignition.

According to the present invention a volatile fuel, such as gasolene, is injected into the suction pipe in a finely divided condition. Owing to the stratification of the mixture produced in this manner in the suction pipe with the working fuel atomized by the injection nozzle, spontaneous ignition is reliably brought about when starting even under the most unfavourable conditions. The idea of the invention may advantageously be embodied in an arrangement in which the starting fuel is injected into a suction pipe which is common to all the cylinders. For this purpose a pump may be employed, the delivery pipe of which may for example be connected with an atomizer to the air suction pipe.

A starting device according to the invention is distinguished by particularly simple construction and reliable action.

One constructional example of the invention is illustrated in the accompanying drawing:—

To an air suction pipe $a$, which may for example be common to all the engine cylinders, with an inlet aperture $f$ for the air, is connected a pump $b$. The latter draws in the volatile fuel by suction from a tank $c$ for example, and forces it through a pipe $d$ and an atomizer $e$ into the suction pipe $a$. The pump may be of any convenient construction. It may be actuated by hand.

The selection of the moment for injection in relation to the crank position, and also of the moment for injecting the working fuel, may be left to the unfettered judgment of the operator.

What I claim is:—

1. In combination with a plurality of internal combustion engine cylinders, a suction pipe having fluid communication with each cylinder, said pipe having an air inlet intermediate its ends, injecting devices in communication with the combustion chambers of the cylinders for injecting directly into said cylinders a difficultly ignitible fuel, an atomizer mounted in one end closure of the suction pipe, a priming fuel reservoir, a pump connected with the reservoir, and a pipe connecting the pump and said end closure atomizer for injecting priming fuel into the suction pipe.

2. A method of starting an internal combustion engine operating on the Diesel principle, consisting in spraying a readily ignitible fuel into the air suction pipe, introducing the resultant mixture of air and readily ignitible fuel into the engine cylinder and compressing the mixture to a pressure at which the temperature of the compressed mixture exceeds the ignition temperature of the readily ignitible fuel, and injecting directly into the compression space of the cylinder in the usual way a fuel that is difficult to ignite so as to enable the heat resulting from the ignition of the readily ignitible fuel to ignite the fuel that is difficut to ignite.

3. Means for starting an internal combustion engine operating on the Diesel principle, comprising the combination with the cylinder and air suction pipe of the engine for supplying combustion air to the cylinder and an injecting device, the outlet of which is in open communication with the combustion chamber of the engine and by means of which a difficultly ignitible working fuel is injected directly into the cylinder, of a fuel reservoir for containing a readily ignitible fuel, a pipe connected to said reservoir and to said air suction pipe and a pump for forcing readily ignitible fuel from the reservoir into the suction pipe.

In testimony whereof I affix my signature.

OTTO HERMANN WEBER.